United States Patent
Smith et al.

(10) Patent No.: US 10,144,434 B2
(45) Date of Patent: Dec. 4, 2018

(54) METHOD AND APPARATUS FOR IDENTIFYING A CAUSE FOR A FUEL INEFFICIENCY OF A VEHICLE VIA A NETWORK

(71) Applicant: AT&T Intellectual Property I, L.P., Atlanta, GA (US)

(72) Inventors: Taylor Smith, Austin, TX (US); Abhay Dabholkar, Allen, TX (US); Charles Drotar, Krum, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 62 days.

(21) Appl. No.: 14/960,307

(22) Filed: Dec. 4, 2015

(65) Prior Publication Data

US 2017/0158203 A1    Jun. 8, 2017

(51) Int. Cl.
*B60W 40/09*    (2012.01)
*G06Q 10/00*    (2012.01)

(52) U.S. Cl.
CPC ............. *B60W 40/09* (2013.01); *G06Q 10/20* (2013.01)

(58) Field of Classification Search
CPC ............................... B60W 40/09; G06Q 10/20
See application file for complete search history.

(56) References Cited

U.S. PATENT DOCUMENTS

| | | |
|---|---|---|
| 6,092,021 A | 7/2000 | Ehlbeck et al. |
| 6,263,268 B1 | 7/2001 | Nathanson |
| 6,505,106 B1 | 1/2003 | Lawrence et al. |
| 6,584,403 B2 | 6/2003 | Bunn |
| 6,778,888 B2 | 8/2004 | Cataldo et al. |
| 6,931,309 B2 | 8/2005 | Phelan et al. |
| 6,988,033 B1 | 1/2006 | Lowrey et al. |
| 7,155,321 B2 | 12/2006 | Bromley et al. |
| 7,715,961 B1 | 5/2010 | Kargupta |
| 7,899,591 B2 | 3/2011 | Shah et al. |
| 8,214,103 B2 | 7/2012 | Kranz et al. |
| 8,416,067 B2 | 4/2013 | Davidson et al. |
| 8,886,392 B1 | 11/2014 | Maeng |

(Continued)

FOREIGN PATENT DOCUMENTS

WO    WO 0133868 A9    8/2002

OTHER PUBLICATIONS

Wikipedia, Aggressive Driving, Jul. 15, 2015 (Year: 2015).*

(Continued)

*Primary Examiner* — Alan D Hutchinson (57) ABSTRACT

A method and apparatus for identifying a cause for a fuel inefficiency of a vehicle are disclosed. For example, the method categorizes a plurality of vehicles into a plurality of peer groups, determines for each peer group a baseline of a vehicle operation efficiency, determines for each peer group a baseline of driving behavior, identifies at least one vehicle with a vehicle operation efficiency in one peer group of the plurality of peer groups that is an outlier as compared to the baseline of the vehicle operation efficiency associated with the one peer group, determines whether a driving behavior of a driver driving the at least one vehicle is an outlier as compared to the baseline of the driving behavior associated with the one peer group, and identifies a cause for the vehicle operation efficiency being an outlier.

20 Claims, 3 Drawing Sheets

(56) References Cited

U.S. PATENT DOCUMENTS

| | | | |
|---|---|---|---|
| 8,928,473 | B2 | 1/2015 | Gilchrist et al. |
| 8,972,163 | B2 | 3/2015 | Green et al. |
| 9,026,343 | B2 | 5/2015 | Mays |
| 9,129,460 | B2 | 9/2015 | Mcclellan et al. |
| 9,135,759 | B2 | 9/2015 | Baer et al. |
| 2001/0018628 | A1 | 8/2001 | Jenkins et al. |
| 2003/0162523 | A1 | 8/2003 | Kapolka et al. |
| 2003/0191566 | A1 | 10/2003 | Ben-assa |
| 2013/0275013 | A1 | 10/2013 | Kote et al. |
| 2013/0332024 | A1* | 12/2013 | Garrett .................... G07C 5/008 701/29.4 |
| 2014/0278294 | A1* | 9/2014 | Yeager ................ G06F 17/5009 703/2 |
| 2015/0081162 | A1* | 3/2015 | Mitchell ............... B60W 40/09 701/32.4 |
| 2015/0178661 | A1 | 6/2015 | Keaveny et al. |
| 2015/0183439 | A1 | 7/2015 | Jackson |
| 2016/0035150 | A1* | 2/2016 | Barfield, Jr. ........... G07C 5/008 701/29.3 |
| 2016/0110650 | A1* | 4/2016 | Basir ..................... B60W 40/09 706/14 |

OTHER PUBLICATIONS

"Easy-to-Use, Web-Based Fleet Software," Verizon, networkfleet. com, Feb. 9, 2014. https://web.archive.org/web/20140209121545/ http://www.networkfleet.com/fleet-solutions/dashboard.htm Discloses "Vehicle Performance—Monitors and tracks ongoing vehicle performance including: Speed history, Fuel economy trends for 30, 60 and 90-day periods, Fuel efficiency trends. Use the web-based fleet software data to analyze the operational effectiveness of each vehicle and make adjustments to improve fuel efficiency, reduce expenses, and lower greenhouse gas emissions."

"How to Monitor Vehicle Fuel Consumption with GPS Tracking," Autos.com™, autos.com, Oct. 7, 2013. http://www.autos.com/car-maintenance/how-to-monitor-vehicle-fuel-consumption-with-gps-tracking Discloses the use of GPS tracking and a cell phone network to improve gas engine efficiency for a fleet of vehicles.

"A Guide to reducing Fuel Consumption with Vehicle Telematics: How to Select the Right Solution," Trapeze™, trapezegroup.com, Jun. 12, 2015. https://web.archive.org/web/20150612224057/http://www.trapezegroup.com/uploads/resources/Trapeze_WP_Fuel_Consumption_FIN_28052013.pdf Discloses the "Trapeze Fleet" application that motors vehicle speed and idling and recoup money wasted in fuel costs, and provides reports about driver behavior.

"GPS Fleet Tracking," Teletrac, teletrac.com, Oct. 5, 2012. https://web.archive.org/web/20121005210640/http://www.teletrac.com/gps-fleet-tracking "A cloud based service that offers Real-time visibility into vehicle and assets; Identify inefficiencies in the fleet; Reduce gas consumption through less vehicle use; Cut idle time and carbon emissions; Cut back on vehicle wear and tear and costly repairs; Review the data that matters most to your fleet."

"Vehicle Monitoring, Fuel Monitoring, Driver Monitoring," GuardMagic, guardmagic.com, Aug. 22, 2013. https://web.archive.org/web/20130822130447/http://guardmagic.com/01-engl/01e-shortly/1-fuel-monitoring/Oe-fuel.htm Discloses the Guardmagic solution that is based on modern GPS and GSM technologies for "Vehicle and Fuel Monitoring".

"Reducing Fuel Costs with GPS Vehicle Monitoring," Telenav, telenav.com, 2011. http://www.telenav.com/tnt-sales/includes/TeleNav%20WhitepaperReducing%20Fuel%20Costs_June2011.pdf Discloses the Telenav solution for location-based applications delivered via a mobile device for reducing fuel costs by monitoring vehicle movements.

"Fleet GPS Tracking Solution," Fleetmatics Review, lead.fleetmatics.com, accessed: Nov. 2015. https://web.archive.org/web/20141114213138/http://lead.fleetmatics.com/fleet-gps-tracking Discloses Fleetmatics GPS tracking solution for providing data about vehicle location, fuel usage, speed, mileage, and other insights into driver behavior.

"Increase Fleet Safety and Reduce Your Risk," FleetSharp, fleetsharp.com, Oct. 13, 2014. https://web.archive.org/web/20141013143826/http://www.fleetsharp.com/benefits-2/ Discloses the Fleetshap solution that uses real time email and SMS alerts to 1) reduce fuel costs and 2)improve fleet safety and efficiency. Deliver better service Reduce your labor costs and operating expenses.

"GPS Vehicle Tracker: Benefit—Reduce Fuel Usage and Idling," Linxup, linxup.com, accessed: Nov. 2015. http://www.linxup.com/benefits/reduce-fuel-use.html Discloses linxup instant vehicle tracking which reduces fuel costs by up to 20% by monitoring individual driver behavior and traveled distances.

* cited by examiner

METHOD AND APPARATUS FOR IDENTIFYING A CAUSE FOR A FUEL INEFFICIENCY OF A VEHICLE VIA A NETWORK

The present disclosure relates to a method and apparatus for identifying a cause for a fuel inefficiency of a vehicle via a network, e.g., a communications network of a network service provider.

BACKGROUND

A customer, e.g., an enterprise customer of a network service provider, may have a large number of vehicles. For example, an enterprise customer may own a large number of vehicles to be used by personnel for reaching various enterprise locations, distribution centers, customer locations, vendor locations, etc., throughout a region, e.g., North America. A particular vehicle of the enterprise customer may be performing sub-optimally in terms of fuel economy. However, the enterprise customer may not know a cause for the sub-optimal performance.

SUMMARY OF THE DISCLOSURE

In one embodiment, the present disclosure teaches a method and apparatus for identifying a cause for a fuel inefficiency of a vehicle via a network of a service provider. For example, the method implemented via a processor categorizes a plurality of vehicles into a plurality of peer groups, determines for each peer group of the plurality of peer groups, a baseline of a vehicle operation efficiency, determines for each peer group of the plurality of peer groups, a baseline of driving behavior, identifies at least one vehicle with a vehicle operation efficiency in one peer group of the plurality of peer groups that is an outlier as compared to the baseline of the vehicle operation efficiency associated with the one peer group, determines whether a driving behavior of a driver driving the at least one vehicle is an outlier as compared to the baseline of the driving behavior associated with the one peer group, and identifies for the at least one vehicle, the driving behavior of a driver driving the vehicle as being a cause for the vehicle operation efficiency being an outlier, when the driving behavior of the driver driving the vehicle is an outlier, or identifies for the at least one vehicle, a need for maintenance of the vehicle as being a cause for the vehicle operation efficiency being an outlier, when the driving behavior of the driver driving the vehicle is not an outlier.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to a method and apparatus for identifying a cause for a fuel inefficiency of a vehicle via a communications network of a network service provider, e.g., a communications network of a communications service provider. The teachings of the present disclosure can be applied via any type of wired or wireless communications network.

When an enterprise customer wishes to determine whether a vehicle is operating inefficiently, the enterprise may track over time an average mileage travelled by the vehicle per each gallon of fuel used (e.g., miles per gallon (MPG)). If the vehicle has been in a fleet of the enterprise for a long period of time, the enterprise may be able to determine whether the efficiency of a particular vehicle is on the decline, e.g., as compared to historical efficiency of the same vehicle. However, if the vehicle became part of the fleet recently, there may not be enough data to determine whether the vehicle is operating inefficiently. In addition, the information that is gathered may not provide an insight as to a cause for an inefficiency that is identified. For instance, although a vehicle may have been part of a fleet for a long period of time, the vehicle may have operated inefficiently starting from the very beginning. Thus, analyzing the historical record of the vehicle would not discover a reduction in efficiency. Hence, the enterprise would not be able to determine the fact that the vehicle was operating inefficiently starting from the very beginning.

One approach to determine if the vehicle is operating efficiently is to compare the MPG of the vehicle against manufacturer specifications for the vehicle. However, the vehicle may be operated in a condition where fuel efficiency is lower. For example, the vehicle may be operated in a large city with many lights and/or stop signs, may be loaded with heavy equipment, may be operated in bad weather, may be operated on congested roads, may be operated at high elevation, and the like. Thus, comparing the efficiency against the manufacturer specifications may not provide accurate information for realistic scenarios. In addition, the manufacturer specification may be for a new vehicle. Moreover, comparing with the manufacturer specification would not provide information for assessing a cause for a reduction in efficiency. For example, the reduction in efficiency may be due to a need for maintenance. In another example, the vehicle may be operated by a driver with bad driving behavior, e.g., a driver who speeds, brakes often, tailgates, etc. Thus, the enterprise may not be able to make necessary changes for increasing the fuel efficiency of the vehicle in a timely manner.

In one embodiment, the method of the present disclosure determines when a vehicle of an enterprise customer is operating inefficiently in terms of fuel consumption and identify a cause for the inefficiency. In one embodiment, the method of the present disclosure is implemented via a processor of a network service provider that provides a service to customers, e.g., enterprise customers, where the service is for providing to the customer a list of vehicles identified as being vehicles operating inefficiently and for each vehicle on the list, a cause for the inefficiency. The enterprise customer may then receive the list of vehicles operating inefficiently and the relevant causes from the network service provider. The enterprise customer may then take an action to address the inefficiency, e.g., by performing repairs, retraining drivers, etc.

Figure 1:
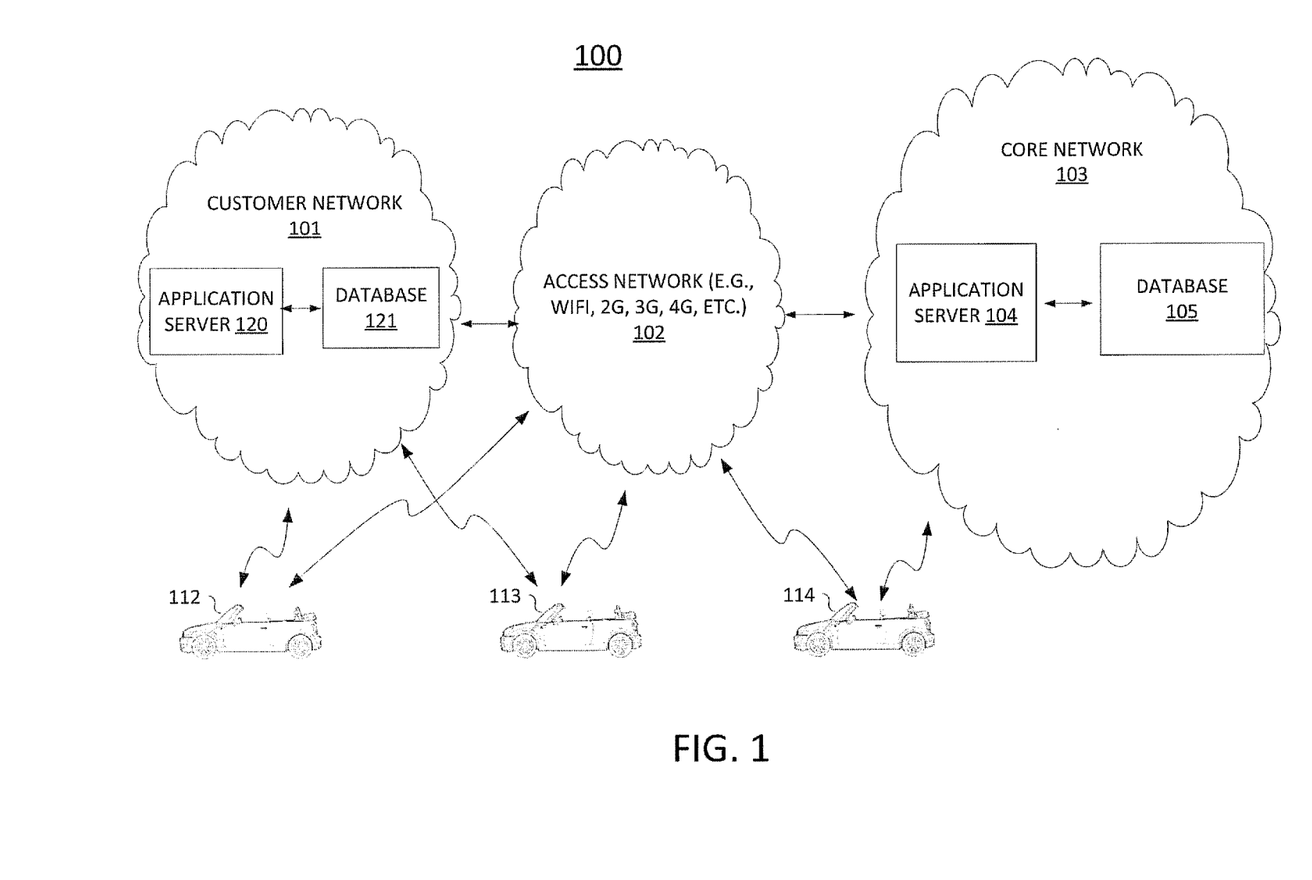
FIG. 1 illustrates an example network related to the present disclosure.

FIG. 1 illustrates an example network 100 related to the present disclosure. In one illustrative embodiment, the network 100 comprises a customer network 101, an access network 102, and a core network 103.

The customer network 101 may be any type of enterprise network. The customer network 101 may comprise network devices, computers, switches, routers, servers, databases, etc., located at a customer location. For example, the customer network 101 may comprise a server 120 and a database 121. Vehicles 112-114 of the customer and the server 120 may access services from the core network 103 via the access network 102.

The access network 102 may comprise a Wireless-Fidelity (Wi-Fi) network, a cellular network (e.g., 2G, 3G, and the like), a long term evolution (LTE) network, and the like. The core network 103 may comprise any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 3:
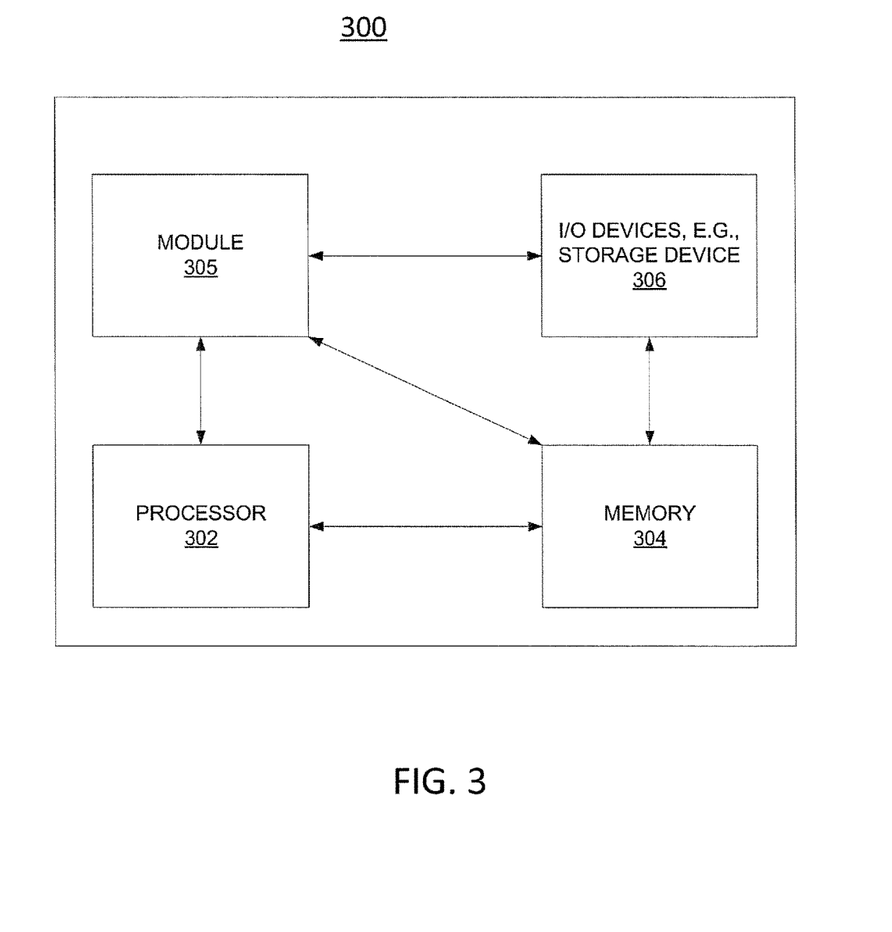
FIG. 3 depicts a high-level block diagram of a computer suitable for use in performing the functions described herein.

In one embodiment, the core network 103 may include an application server (AS) 104, and a database 105. For example, the AS 104 may be deployed as a hardware device embodied as a dedicated database server (e.g., the dedicated computer 300 as illustrated in FIG. 3). In one embodiment, the AS 104 is configured to perform the methods and functions described herein (e.g., the method 200 discussed below).

It should be noted that the network 100 may include additional networks and/or elements that are not shown to simplify FIG. 1. For example, the customer network, access network and the core network of FIG. 1 may include additional network elements (not shown), such as for example, base stations, border elements, gateways, firewalls, routers, switches, call control elements, various application servers, and the like.

Although one database in the core network and one database in the customer network are shown in FIG. 1, the various types of data may be stored in any number of databases. For instance, various databases, e.g., a database for maintenance records of vehicles, a database for data gathered from sensors in vehicles, a database for weather data gathered for locations of vehicles, a database for refueling data associated with vehicles, a database for data gathered from servers of the customer (e.g., server 120), a database for population density obtained from municipality records, a database for road conditions gathered from third parties, etc., may be used. In addition, the various types of data may be stored in a cloud storage. In other words, the network service provider may implement a service for identifying a list of vehicles with inefficiencies, determining, for each vehicle in the list, a cause for the inefficiency, and storing the list of vehicles that are identified as being inefficient and respective causes in a cloud storage and/or a centralized server.

In one embodiment, the database 105 is used for storing various data, e.g., maintenance records of vehicles, data gathered from sensors in vehicles, weather data gathered for locations of vehicles, refueling data associated with vehicles, data gathered from servers of the customer (e.g., from server 120), population density data, road condition data, and the like.

In one embodiment, the AS 104 is used for implementing the present method for identifying a list of vehicles with inefficiencies, and determining, for each vehicle in the list, a cause for the inefficiency. The AS 104 of the present disclosure is for categorizing a plurality of vehicles into a plurality of peer groups, and determining for each particular peer group of the plurality of peer groups: 1) a baseline for vehicle efficiency (e.g., fuel efficiency), 2) a baseline of driving behavior, and/or 3) whether there is at least one vehicle in the particular peer group with an efficiency that is an outlier as compared to the baseline of the efficiency associated with the particular peer group. In one example, the AS 104 may determine for an outlier vehicle in the particular peer group, whether a driving behavior of the driver driving the outlier vehicle is an outlier as compared to the baseline of the driving behavior associated with the particular peer group. In turn, the AS 104 may then identify the driving behavior of the driver driving the outlier vehicle as being the cause for the vehicle's efficiency being cited as an outlier. Alternatively, if the AS 104 does not identify the driving behavior of the driver driving the outlier vehicle as being the cause, then the AS 104 may identify that a need for maintenance of the vehicle as being a cause for the vehicle's efficiency being cited as an outlier.

Figure 2:
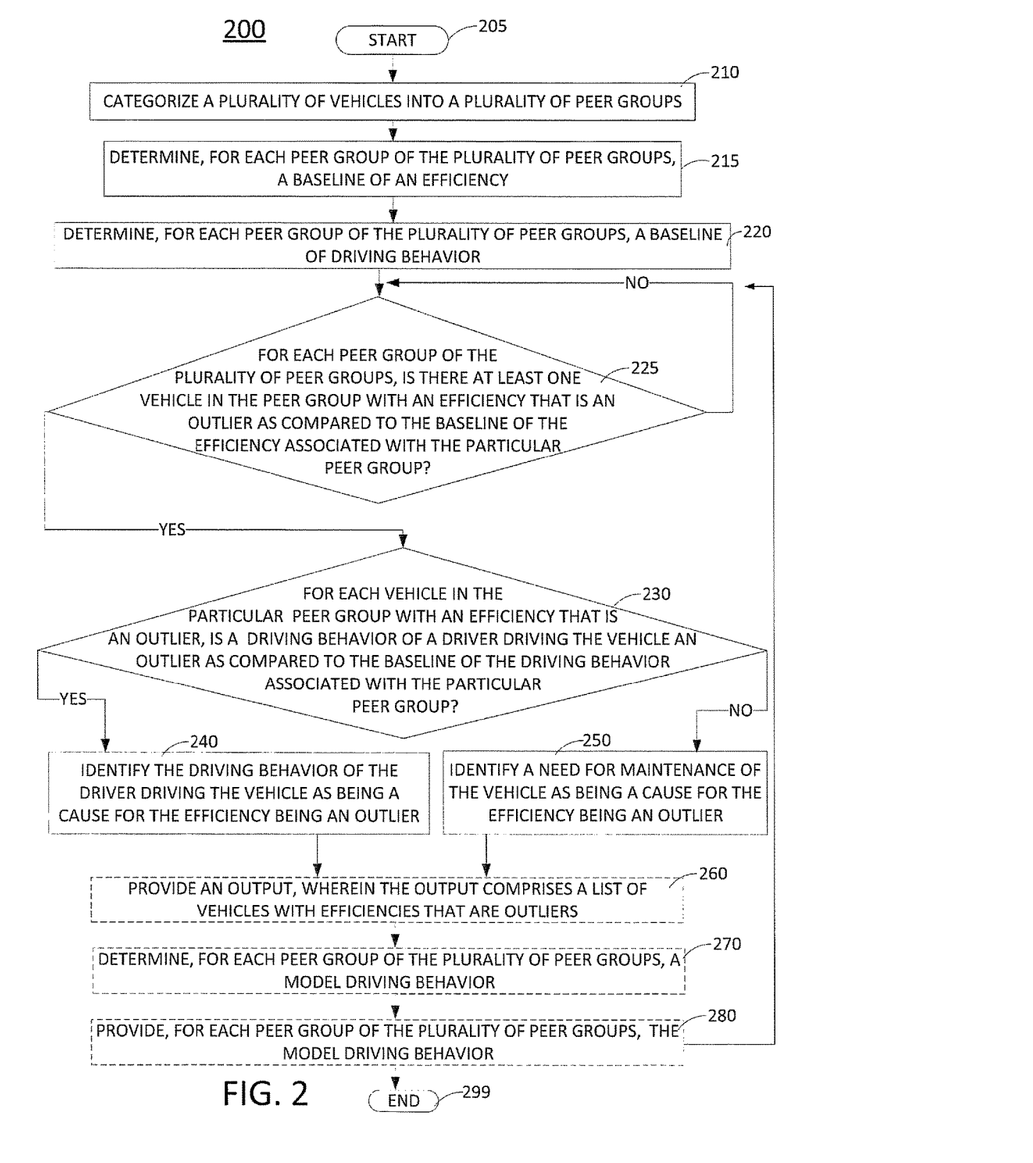
FIG. 2 illustrates a flowchart of an example method for identifying a cause for a fuel inefficiency of a vehicle via a communications network of a network service provider.

FIG. 2 illustrates a flowchart of an example method 200 for identifying a cause for a fuel inefficiency of a vehicle in accordance with the present disclosure. In one embodiment, the method 200 may be implemented in an application server, e.g., an application server 104, for identifying a cause for a fuel inefficiency of a vehicle or the processor 302 as described in FIG. 3 below. The method 200 starts in step 205 and proceeds to step 210.

In step 210, the processor categorizes a plurality of vehicles into a plurality of peer groups. In one embodiment, the categorizing of a particular vehicle into a peer group of the plurality of peer groups may be based on one or more of: 1) a type of the particular vehicle, 2) a type of fuel used by the particular vehicle, 3) a weight of the particular vehicle, 4) a geographical location wherein the particular vehicle is operated, 5) a population density at a location wherein the particular vehicle is operated, or 6) a manufacturer of the particular vehicle, etc. A metric may be established for the categorizing based on a plurality of criteria for placing each vehicle into a particular peer group. Each peer group is defined by the service provider and/or customer as being a peer group for vehicles that would be expected to have similar vehicle operation efficiency, e.g., fuel consumption efficiency. For example, if a truck weighs five times that of a car, the truck and the car may not have similar fuel consumption efficiencies. Thus, the truck and the car may not belong in a same peer group. Accordingly, the metric of the present disclosure may have several dimensions, with each dimension addressing one criterion, e.g., a criterion for a type of vehicle, a criterion for a location at which the vehicle is operated, a criterion for a population density at a location at which the vehicle is operated, a criterion for a type of fuel used by the vehicle, a criterion for a weight of a vehicle, and so on. For example, a first peer group may be for trucks located in a suburb with population density between 10000 and 20000 people per square mile, the trucks using diesel fuel and weighing between 5000 and 7000 pounds, whereas a second peer group may be for cars being operated in a rural area with population density between 1000 and 5000 people per square mile, the cars using standard gasoline fuel and weighing between 2000 and 3000 pounds, and so on.

In one example, for each particular vehicle of the plurality of vehicles, a type of the vehicle indicates whether the particular vehicle is a truck, a trailer, a sports utility vehicle (SUV), a van, a car or a motorcycle. In one embodiment, a type of the particular vehicle may further indicate a manufacturer of the vehicle.

In one embodiment, the categorizing of the vehicles based on the types of fuels used by the vehicles may be for placing each vehicle into a peer group based on whether the vehicle uses diesel fuel, standard gasoline fuel, premium gasoline grade fuel, fuel containing ethanol, natural gas, etc. For example, a peer group may be for vehicles that use diesel fuel, another peer group may be for vehicle that use natural gas, and so on.

In one embodiment, the categorizing of vehicles based on weights of vehicles is performed by first establishing a plurality of peer groups based on weights, wherein each peer group of the plurality of peer groups is for a predetermined range of weights, and then assigning each vehicle to a peer group of the plurality of peer groups in accordance with the weight of the particular vehicle. In one embodiment, the network service provider or the enterprise customer determines the predetermined range of weight for each peer group of the plurality of peer groups that is established.

In one embodiment, for each vehicle of the plurality of vehicles, the location at which the particular vehicle is operated indicates one or more of: whether the particular vehicle is operated in an urban location, in a suburban location, or in a rural location. In one embodiment, the location at which the particular vehicle is operated may further be defined based on population density. For example, if a vehicle is mostly operated in an area with population density of 50 people per square mile, then the location of the vehicle may be indicated as being a "rural" setting, and the like (e.g., other population density settings may comprise a "suburb" setting of 200 people per square mile, a "town" setting of 400 people per square mile, a "city" setting of 800 people per square mile, and so on). In one embodiment, the network service provider and/or enterprise customer may establish a plurality of location indicators. In one embodiment, each location indicator of the plurality of location indicators may be for a pre-determined range of population density. In one embodiment, the population density for a particular location may be obtained from a database that provides population densities per zip code.

In step 215, the processor determines, for each peer group of the plurality of peer groups, a baseline of an efficiency (e.g., a vehicle operation efficiency, e.g., more specifically a fuel consumption efficiency). In one embodiment, the baseline of the efficiency that is determined comprises one or more of: an average of miles traveled per gallon of fuel for all vehicles in the particular peer group, a median of miles traveled per gallon of fuel for all vehicles in the particular peer group, a probability distribution of miles traveled per gallon of fuel for all vehicles in the particular peer group, etc.

In one embodiment, the baseline of the efficiency is determined in accordance with data obtained from one or more sources. In one embodiment, the data that is obtained comprises one or more of: refueling data, maintenance data, sensor data derived from the vehicles, weather data, and the like.

In one embodiment, the refueling data is obtained from a database of the customer. In one embodiment, the refueling data is obtained directly from the vehicle, e.g., via a sensor implemented in the vehicle. In one embodiment, the refueling data is obtained from a financial transaction database for fuel purchases, e.g., a database containing pre-paid card records, debit card records, credit card records, expense account records, etc.

In one embodiment, the maintenance data for a vehicle comprises a list of maintenance tasks or procedures performed on the vehicle, and for each maintenance task or procedure on the list, a date and/or time indicating when the maintenance task or procedure was performed. For example, the list of maintenance tasks or procedures may indicate records for oil change, transmission fluid change, coolant fluid change, oil filter change, air filter change, adjustment of tire pressure, tire alignment, tire change, tune up (e.g., spark plugs change), brakes change, battery change, and so on. In one embodiment, the maintenance data for the vehicle may be obtained from a database of the customer. In one embodiment, the maintenance data may be obtained from a maintenance service provider of the customer. In one embodiment, the maintenance data may be obtained from one or more sensors deployed in the vehicle. For example, a sensor may transmit data to the network service provider when the motor oil on a vehicle is changed, when tune up is performed, when the tire is changed, when the tire pressure is adjusted, etc.

In one embodiment, the sensor data for the vehicle may comprise one or more of: maintenance data (e.g., as described above), an average Revolutions Per Minute (RPM) of the engine, an average speed of the vehicle, a median speed of the vehicle, a distribution of the speed of the vehicle over a period of time, a number of stops and starts by the vehicle, a frequency of braking per a pre-determined period of time, a number of times of hard-braking action per a pre-determined period of time, a percentage of time spent idling without moving, a number of times the vehicle slows down and then accelerates, etc.

In one embodiment, the network service provider and/or the customer may determine the criteria for a braking action to qualify as a hard-braking action. For example, the braking action to decrease a speed of the vehicle by a predetermined percentage within a given time, e.g., a rate of change of speed over time, may be used to define the hard-braking action. For instance, reducing the speed by 20% within a second may be defined as a criterion for hard-braking action.

In one embodiment, the number of times of hard-braking action for a period of time, e.g., a month, may be provided as a raw number or as a percentage of the total number of braking actions performed by the vehicle. For example, if a driver is tailgating, a large percentage of the braking actions may be hard-braking actions. In contrast, if the driver is keeping a proper distance from other vehicles, there may be fewer hard-braking actions. In another embodiment, a length of time between brake pad changes may be used as an indicator of excessive hard-braking action. For example, a sensor may transmit information to the network service provider when a brake pad of the vehicle is changed.

In one embodiment, the average RPM of the engine, the median speed and/or distribution of speed are determined for a pre-determined time period. For example, the method may determine for a pre-determined time period, e.g., a month, for a particular vehicle having: an average speed of 55 mph, a median speed of 60 mph, a distribution of speed that indicates 10% of the time spent idling (zero mph), 20% of time spent driving 1-30 mph, 20% of time spent driving 31-50 mph, 20% of time spent driving 51-60 mph, 10% of time spent driving 61-65 mph, 10% of time spent driving 66-75 mph, and 10% of time driving 76-90 mph. This is only an illustrative example.

In one embodiment, the weather data is obtained from a database of a third party, e.g., a weather database maintained by a government entity (e.g., a national weather service such as National Oceanic and Atmospheric Administration (NOAA)), meteorological news station, etc. In one embodiment, the weather data may be obtained from one or more sensors deployed in the vehicle. For example, an environmental sensor may be used to record weather conditions (e.g., atmospheric temperature, moisture in the air and/or roadway, or wind condition) and report such weather conditions to the network service provider directly.

In step 220, the processor determines, for each peer group of the plurality of peer groups, a baseline of driving behavior. In one embodiment, the baseline of the driving behavior that is determined may comprise one or more of: a behavior associated with speeding, a behavior associated with braking, a behavior associated with accelerating, a behavior associated with tailgating, a behavior associated with stopping and going in a short period of time, a behavior associated with lane changing, etc. The baseline of the driving behavior for a particular peer group may be established by analyzing sensor data, maintenance data, etc.

In step 225, the processor determines, for each peer group of the plurality of peer groups, whether there is at least one vehicle in a particular peer group with an efficiency that is an outlier as compared to the baseline of the efficiency associated with the particular peer group. The efficiency of the vehicle may be based on a comparison of a number of miles traveled per gallon of fuel (MPG). For example, the method may perform anomaly detection, e.g., a density based scan for anomaly detection, for the peer group to identify any vehicles with MPGs significantly lower than the baseline MPG for the peer group. If an outlier vehicle is determined for the peer group, the method proceeds to step 230. Otherwise, the method continues with searching for vehicles that are outliers. That is, the method continues with the process of step 225, processing data for the particular peer group as well as other peer groups.

For example, a vehicle may be operating with an MPG that is n standard deviations below the mean MPG of the peer group, wherein a value of n for defining the vehicle as being an outlier is predetermined by the service provider and/or the customer. Then, n may be approximately equal to one, if the MPG of the peer group follows a standard normal distribution and the outlier is defined as being a vehicle operating with MPG that is in the lowest 16% of MPGs for the peer group. The detection of the outliers may be performed using any standard anomaly detection techniques. The technique is applied for detecting the anomaly based on a comparison of MPGs within a same peer group.

In step 230, the processor determines, for each vehicle in the particular peer group with an efficiency that is an outlier, whether a driving behavior of a driver driving the vehicle is an outlier as compared to the baseline of the driving behavior associated with the particular peer group. For example, if a particular vehicle x is an outlier in terms of its efficiency as compared to other vehicles in its peer group, the method determines whether the driving behavior of the driver driving vehicle x is also an outlier as compared to other drivers driving vehicles within the same peer group of vehicle x. If the driving behavior of the driver driving the vehicle is an outlier, the method proceeds to step 240. Otherwise, the method proceeds to step 250.

In step 240, the processor identifies, for each vehicle in the particular peer group with an efficiency that is an outlier, the driving behavior of the driver driving the vehicle as being a cause for the efficiency being an outlier. For example, if the driving behavior significantly varies from a normal (baseline) behavior within the peer group, the driver may need to be retrained. For instance, the MPG of the vehicle may have been reduced due to a driver who accelerates and brakes too often due to aggressive driving behavior. The method then identifies the driving behavior as being a cause for the efficiency of the vehicle being an outlier. The method then proceeds to step 260.

In step 250, the processor identifies a need for maintenance of the vehicle as being a cause for the efficiency being an outlier, when the driving behavior of the driver driving the vehicle is not an outlier. For example, if the driving behavior is average when compared to the baseline behavior within the same peer group, the driving behavior may not be the cause for the inefficiency of the vehicle being an outlier. For instance, maintenance may need to be performed on the vehicle to improve the MPG of the vehicle. The method then proceeds to step 260.

In optional step 260, the processor provides an output, wherein the output comprises a list of vehicles with efficiencies that are deemed outliers. For example, the method may provide, for each peer group, a list of vehicles with MPGs that are outliers as compared to a baseline MPG that is determined for the peer group.

In one embodiment, the output further comprises, for each vehicle in the list of vehicles, the cause for the efficiency being an outlier. For example, if vehicle y is an outlier and the driving behavior of the driver driving vehicle y is not an outlier, vehicle y is included in the list of vehicles and the cause for the efficiency of vehicle y being an outlier is provided as being a need for maintenance.

In optional step 270, the processor determines, for each particular peer group of the plurality of peer groups, a model driving behavior. For example, the method may analyze the MPGs of each peer group to identify which vehicles are operating with a high level of efficiency. The method may then determine, for each vehicle with a high level of efficiency, if the high level of efficiency is attributable to maintenance. When the high level of efficiency is not attributable to maintenance, the method attributes the high level of efficiency to a driving behavior of the driver operating the vehicle. The method then performs an analysis to identify a model driving behavior as being the driving behavior that resulted in the high level of efficiency. For example, if vehicles driven consistently at 55 mph are vehicles with the highest level of fuel consumption efficiency, then other drivers may be trained or encouraged to drive close to the speed of 55 mph.

In optional step 280, the processor provides, for each particular peer group of the plurality of peer groups, the model driving behavior, e.g., to a customer. For example, the output may be provided to the customer server or database including the model driving behavior. The customer may then be able to use the information to retrain drivers when needed. In one embodiment, the model behavior can be transmitted directly to the vehicle itself, e.g., displaying the model behavior on a dashboard display and/or broadcasting the model behavior as an audio message (e.g., "Please maintain speed at 55 mph to obtain maximum fuel efficiency."). The method then proceeds either to step 299 to end processing the current method or to step 225 to continue identifying outliers.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

As such, the present disclosure provides at least one advancement in the technical field of vehicle management. For instance, in one example, the present disclosure provides a server and a communication network that is able to correlate vehicle operating data with various modeling to identify the root cause of fuel consumption inefficiency for one or more vehicles for an enterprise customer.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for identifying a cause for a fuel inefficiency, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or each of the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 305 for identifying a cause for a fuel inefficiency (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for identifying a cause for a fuel inefficiency (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:

categorizing, via a processor, a plurality of vehicles into a plurality of peer groups, wherein the categorizing of a vehicle of the plurality of vehicles is based on at least one of: a weight of the vehicle and a population density at a location wherein the vehicle is operated;

determining, via the processor, for each peer group of the plurality of peer groups, a baseline of a vehicle operation efficiency;

determining, via the processor, for each peer group of the plurality of peer groups, a baseline of driving behavior, wherein the baseline of the driving behavior that is determined comprises one or more of: a behavior associated with speeding, a behavior associated with braking, a behavior associated with accelerating, a behavior associated with tailgating, a behavior associated with stopping and going, and a behavior associated with lane changing;

identifying, via the processor, at least one vehicle with a vehicle operation efficiency in one peer group of the plurality of peer groups that is a vehicle operation efficiency outlier as compared to the baseline of the vehicle operation efficiency associated with the one peer group;

determining, via the processor, whether a driving behavior of a driver driving the at least one vehicle is a driving behavior outlier as compared to the baseline of the driving behavior associated with the one peer group;

identifying, via the processor, for the at least one vehicle, the driving behavior of the driver driving the vehicle as being a cause for the vehicle operation efficiency being identified as the vehicle operation efficiency outlier, when the driving behavior of the driver driving the vehicle is determined to be the driving behavior outlier, or identifying for the at least one vehicle, a need for maintenance of the vehicle as being the cause for the vehicle operation efficiency being identified as the vehicle operation efficiency outlier, when the driving behavior of the driver driving the vehicle is not determined to be the driving behavior outlier; and providing, via the processor, an output, wherein the output comprises the at least one vehicle in a list of vehicles with vehicle operation efficiencies and, for each vehicle in the list of vehicles, the cause for the vehicle operation efficiency being determined to be the vehicle operation efficiency outlier.

2. The method of claim 1, further comprising:
determining, via the processor, for each peer group of the plurality of peer groups, a model driving behavior.

3. The method of claim 2, further comprising:
providing, via the processor, for each peer group of the plurality of peer groups, the model driving behavior that is determined, to a customer.

4. The method of claim 1, wherein the baseline of the vehicle operation efficiency that is determined comprises one or more of: an average of miles traveled per gallon of fuel for all vehicles in each peer group, a median of miles traveled per gallon of fuel for all vehicles in each peer group, and a probability distribution of miles traveled per gallon of fuel for all vehicles in each peer group.

5. The method of claim 1, wherein the baseline of the vehicle operation efficiency is determined in accordance with data obtained from one or more sources, wherein the data that is obtained comprises one or more of: refueling data, maintenance data, sensor data, and weather data.

6. The method of claim 5, wherein the refueling data is obtained from a database of a customer.

7. The method of claim 5, wherein the refueling data is obtained directly from the plurality of vehicles.

8. The method of claim 5, wherein the refueling data is obtained from a financial transaction database.

9. The method of claim 8, wherein the financial transaction database contains one or more of: pre-paid card records, debit card records, credit card records, and expense account records.

10. The method of claim 5, wherein the maintenance data is obtained from one or more of: a customer database, a database of a maintenance service provider of a customer, and the plurality of vehicles.

11. The method of claim 5, wherein the sensor data comprises one or more of: maintenance data, an average revolutions per minute of an engine, an average speed of a vehicle, a median speed of a vehicle, a distribution of a speed of a vehicle, a number of stops and starts by a vehicle, a frequency of braking per a pre-determined period of time, a number of times of hard-braking action per a pre-determined period of time, a percentage of time spent idling, and a number of times a vehicle slows down and then accelerates.

12. The method of claim 5, wherein the weather data is obtained from a database of a weather service provider.

13. The method of claim 1, wherein the vehicle is a truck, a trailer, a sports utility vehicle, a van, a car or a motorcycle.

14. A non-transitory computer-readable storage device storing a plurality of instructions which, when executed by a processor, cause the processor to perform operations, the operations comprising:
categorizing a plurality of vehicles into a plurality of peer groups, wherein the categorizing of a vehicle of the plurality of vehicles is based on at least one of: a weight of the vehicle and a population density at a location wherein the vehicle is operated;

determining for each peer group of the plurality of peer groups, a baseline of a vehicle operation efficiency;

determining for each peer group of the plurality of peer groups, a baseline of driving behavior, wherein the baseline of the driving behavior that is determined comprises one or more of: a behavior associated with speeding, a behavior associated with braking, a behavior associated with accelerating, a behavior associated with tailgating, a behavior associated with stopping and going, and a behavior associated with lane changing;

identifying at least one vehicle with a vehicle operation efficiency in one peer group of the plurality of peer groups that is a vehicle operation efficiency outlier as compared to the baseline of the vehicle operation efficiency associated with the one peer group;

determining whether a driving behavior of a driver driving the at least one vehicle is a driving behavior outlier as compared to the baseline of the driving behavior associated with the one peer group;

identifying for the at least one vehicle, the driving behavior of the driver driving the vehicle as being a cause for the vehicle operation efficiency being identified as the vehicle operation efficiency outlier, when the driving behavior of the driver driving the vehicle is determined to be the driving behavior outlier, or identifying for the at least one vehicle, a need for maintenance of the vehicle as being the cause for the vehicle operation efficiency being identified as the vehicle operation efficiency outlier, when the driving behavior of the driver driving the vehicle is not determined to be the driving behavior outlier; and providing an output, wherein the output comprises the at least one vehicle in a list of vehicles with vehicle operation efficiencies and, for each vehicle in the list of vehicles, the cause for the vehicle operation efficiency being determined to be the vehicle operation efficiency outlier.

15. An apparatus comprising:
a processor; and
a computer-readable storage device storing a plurality of instructions which, when executed by the processor, cause the processor to perform operations, the operations comprising:
categorizing a plurality of vehicles into a plurality of peer groups, wherein the categorizing of a vehicle of the plurality of vehicles is based on at least one of: a weight of the vehicle and a population density at a location wherein the vehicle is operated;

determining for each peer group of the plurality of peer groups, a baseline of a vehicle operation efficiency;

determining for each peer group of the plurality of peer groups, a baseline of driving behavior, wherein the baseline of the driving behavior that is determined comprises one or more of: a behavior associated with speeding, a behavior associated with braking, a behavior associated with accelerating, a behavior associated with tailgating, a behavior associated with stopping and going, and a behavior associated with lane changing;

identifying at least one vehicle with a vehicle operation efficiency in one peer group of the plurality of peer groups that is a vehicle operation efficiency outlier as compared to the baseline of the vehicle operation efficiency associated with the one peer group;

determining whether a driving behavior of a driver driving the at least one vehicle is a driving behavior outlier as compared to the baseline of the driving behavior associated with the one peer group;

identifying for the at least one vehicle, the driving behavior of the driver driving the vehicle as being a cause for the vehicle operation efficiency being identified as the vehicle operation efficiency outlier, when the driving behavior of the driver driving the vehicle is determined to be the driving behavior outlier, or identifying for the at least one vehicle, a need for maintenance of the vehicle as being the cause for the vehicle operation efficiency being identified as the vehicle operation efficiency outlier, when the driving behavior of the driver driving the vehicle is not determined to be the driving behavior outlier; and providing an output, wherein the output comprises the at least one vehicle in a list of vehicles with vehicle operation efficiencies and, for each vehicle in the list of vehicles, the cause for the vehicle operation efficiency being determined to be the vehicle operation efficiency outlier.

16. The apparatus of claim 15, the operations further comprising:

determining, for each peer group of the plurality of peer groups, a model driving behavior.

17. The apparatus of claim 16, the operations further comprising:

providing for each peer group of the plurality of peer groups, the model driving behavior that is determined, to a customer.

18. The apparatus of claim 15, wherein the baseline of the vehicle operation efficiency that is determined comprises one or more of: an average of miles traveled per gallon of fuel for all vehicles in each peer group, a median of miles traveled per gallon of fuel for all vehicles in each peer group, and a probability distribution of miles traveled per gallon of fuel for all vehicles in each peer group.

19. The apparatus of claim 15, wherein the baseline of the vehicle operation efficiency is determined in accordance with data obtained from one or more sources, wherein the data that is obtained comprises one or more of:

refueling data, maintenance data, sensor data, and weather data.

20. The apparatus of claim 19, wherein the refueling data is obtained:

from a database of a customer, directly from the plurality of vehicles, or from a financial transaction database.

* * * * *